(12) United States Patent
Tang (10) Patent No.: US 10,993,105 B2
(45) Date of Patent: Apr. 27, 2021

(54) METHOD AND DEVICE FOR ESTABLISHING ASSOCIATION BETWEEN TERMINAL DEVICES

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 113 days.

(21) Appl. No.: 15/999,276

(22) PCT Filed: Apr. 7, 2016

(86) PCT No.: PCT/CN2016/078659
§ 371 (c)(1),
(2) Date: Aug. 17, 2018

(87) PCT Pub. No.: WO2017/173614
PCT Pub. Date: Oct. 12, 2017

(65) Prior Publication Data
US 2019/0104404 A1    Apr. 4, 2019

(51) Int. Cl.
*H04W 8/24* (2009.01)
*H04W 76/14* (2018.01)
(Continued)

(52) U.S. Cl.
CPC ............ *H04W 8/24* (2013.01); *H04W 28/24* (2013.01); *H04W 48/16* (2013.01);
(Continued)

(58) Field of Classification Search
CPC ........... H04W 8/22–245; H04W 88/04; H04W 76/11; H04W 76/14; H04W 4/70;
(Continued)

(56) References Cited

U.S. PATENT DOCUMENTS

2011/0003545 A1   1/2011  Vainikka
2014/0123232 A1*  5/2014  Kuscher ............... H04W 12/08
                                                                726/4
(Continued)

FOREIGN PATENT DOCUMENTS

CN   102017672 A   4/2011
CN   104081873 A   10/2014
(Continued)

OTHER PUBLICATIONS

Zte et al; "Application Layer Group ID and security parameters ", 3GPP DRAFT; 24334_CR0218R3 (REL-13) C1-161267, 3rd Generation Partnership Project (3GPP), Mobile Competence Centre; 650, Route Des Lucioles; F-06921 Sophia-Antipolis Cedex; France,vol. CT WG1, No. Jeju (Korea); Feb. 15, 2016- Feb. 19, 2016 (Mar. 6, 2016), XP051074966, Retrieved from the Internet: URL:http://www.3gpp.org /ftp/Meetings_3GPP_SYNC/CT/Docs/ [retrieved on Mar. 6, 2016] * p. 1-p. 9.

(Continued)

*Primary Examiner* — Paul H Masur
(74) *Attorney, Agent, or Firm* — Ladas & Parry LLP (57) ABSTRACT

Provided are terminal devices and a method for establishing association between terminal devices. A first terminal device transmits information of terminal capabilities to a network device, the information of terminal capabilities being used to indicate that the terminal device has capabilities of receiving and forwarding data. The first terminal device receives confirmation information for confirming that the terminal device has the capabilities of receiving and forwarding data, from the network device. The first terminal device establishes an association with a second terminal device according to the confirmation information.

18 Claims, 4 Drawing Sheets

(51) Int. Cl.
| | |
|---|---|
| *H04W 88/04* | (2009.01) |
| *H04W 76/11* | (2018.01) |
| *H04W 28/24* | (2009.01) |
| *H04W 48/16* | (2009.01) |
| *H04W 72/04* | (2009.01) |
| *H04L 29/06* | (2006.01) |

(52) U.S. Cl.
CPC ........ *H04W 72/0473* (2013.01); *H04W 76/11* (2018.02); *H04W 76/14* (2018.02); *H04W 88/04* (2013.01); *H04L 65/80* (2013.01); *Y02D 30/70* (2020.08)

(58) Field of Classification Search
CPC .............. H04W 28/24; H04W 72/0473; Y02D 70/126; Y02D 70/14; Y02D 70/40; H04L 65/80
See application file for complete search history.

(56) References Cited

U.S. PATENT DOCUMENTS

| | | | |
|---|---|---|---|
| 2015/0029866 A1 | 1/2015 | Liao et al. | |
| 2015/0180565 A1 | 6/2015 | Rakotoharison | |
| 2015/0281939 A1* | 10/2015 | Li | H04W 8/005 455/426.1 |
| 2016/0197927 A1 | 7/2016 | Ma et al. | |
| 2016/0286459 A1* | 9/2016 | Enomoto | H04L 65/4076 |
| 2017/0041779 A1* | 2/2017 | Sandhu | H04W 8/005 |

FOREIGN PATENT DOCUMENTS

| | | |
|---|---|---|
| CN | 104283602 A | 1/2015 |
| CN | 104469695 A | 3/2015 |
| CN | 104902456 A | 9/2015 |
| CN | 105228213 A | 1/2016 |
| CN | 105228218 A | 1/2016 |
| EP | 2833694 A2 | 2/2015 |
| JP | 2005537706 A | 12/2005 |
| JP | 2011514720 A | 5/2011 |
| JP | 2013516915 A | 5/2013 |
| JP | 2015505646 A | 2/2015 |
| JP | 2016502784 A | 1/2016 |
| WO | 2015068731 A1 | 5/2015 |
| WO | 2015085223 A1 | 6/2015 |

OTHER PUBLICATIONS

Alcatel-Lucent et al: "Access schemes for D2D broadcast communications", 3GPP DRAFT; R2-133486 Communication, 3rd Generation Partnership Project (3GPP), Mobile Competence Centre : 650, Route Des Lucioles ; F-06921 Sophia-Antipolis Cedex; France,vol. RAN WG3, No. Ljubljana, Slovenia; Oct. 7, 2013-Oct. 11, 2013 Sep. 28, 2013 (Sep. 28, 2013), XP050719205, Retrieved from the Internet URL http://www.3gpp.org/ftp/tsg_ran/WG2_RL2/TSGR2_83bis/Docs/ [retrieved on Sep. 28, 2013] * p. 1-p. 5*.
Supplementary European Search Report in the European application No. 16897549.8, dated Mar. 25, 2019.
Ericsson: "On Scenarios and Objectives for Wearables and feD2D", 3GPP DRAFT; R2-162529—On Scenarios and Objectives for Wearables and FED2D, 3rd Generation Partnership Project (3GPP), Mobile Competence Centre ; 650, Route Des Lucioles ; F-06921 Sophia-Antipolis Ce, vol. RAN WG2, No. Dubrovnik, Croatia; Apr. 11, 2016-Apr. 15, 2016 Apr. 2, 2016 (Apr. 2, 2016), XP051082435, Retrieved from the Internet:URL:http://www.3gpp.org/ftp/tsg_ran/WG2_RL2/TSGR2_93bis/Docs/ [retrieved on Apr. 2, 2016].
Partial Supplementary European Search Report in European application No. 16897549.8, dated Dec. 11, 2018.
English Translation of the Written Opinion of the International Search Authority in international application No. PCT/CN2016/078659, dated Dec. 30, 2016.
International Search Report in international application No. PCT/CN2016/078659, dated Dec. 30, 2016.
Written Opinion of the International Search Authority in international application No. PCT/CN2016/078659, dated Dec. 30, 2016.
First Office Action in corresponding Japanese application No. 2018-547901, dated Feb. 4, 2020.
ZTE: "ProSe UE-to-Network Relay", 3GPP SA WG2 Meeting #98 S2-132642, Jul. 19, 2013.
First Office Action in corresponding Chinese application No. 201680081739.7, dated Apr. 27, 2020.
Office Action of the Indian application No. 201817034793, dated May 27, 2020.
Office Action of the Taiwaness application No. 106111243, dated Jul. 8, 2020.

* cited by examiner

METHOD AND DEVICE FOR ESTABLISHING ASSOCIATION BETWEEN TERMINAL DEVICES

RELATED APPLICATION

This application is an application under 35 U.S.C. 371 of International Application No. PCT/CN2016/078659filed on 07 Apr. 2016, the entire contents of which are incorporated herein by reference.

TECHNICAL FIELD

Embodiments of the disclosure relate to the field of communications, and in particular to a method and device for establishing an association between terminal devices.

BACKGROUND

In existing wireless communication systems, in addition to conventional handheld terminals, various other types of terminals have emerged, including smart bracelets, wireless televisions, smart glasses, robots, watches, and the like. These smart terminals are connected to the network or connected to other terminals by various technologies. For example, a smart bracelet may be connected to a mobile phone via Bluetooth, to transmit information: a wireless television may be connected to the network through Wireless Fidelity (Wi-Fi), to download or upload TV programs; and smart glasses may be connected to the network through a Universal Mobile Telecommunications System (UMTS) module or a Long Term Evolution (LTE) module, to exchange information; a robot may be connected to the network or mobile phone through a Wi-Fi mode; and a watch may be connected to the network or a mobile phone through Wi-Fi or Bluetooth.

In the future, based on all of the terminals, a complete set of wearable devices will constitute a human-centered system, thereby forming a human-centered network. This network is a network that is always human-centered and can be moved in real time. The network consists of glasses, hats, earrings, necklaces, bracelets, watches, belts, shoes, clothes, pants, etc. in addition to traditional mobile phones. These terminals use sensors, cameras, earpieces and other devices to maximize the human hearing, vision, taste, smell and touch, thus providing a more intimate service and experience for a person.

The main connection modes of existing wearable devices with other terminals and other networks include a Wi-Fi connection and a Bluetooth connection. In the future, LTE-based communication systems may provide a lower cost, more power-efficient connection mode for wearable systems.

SUMMARY

The disclosure provides a method and device for establishing an association between terminal devices, capable of establishing an association between terminal devices based on an existing LTE communication system for data transmission, so as to save the power of the terminal devices and reduce the cost for communication between terminal devices, and capable of transmitting data of the terminal devices to a network, so that a user can share or acquire required information anytime and anywhere.

A first aspect provides a method for establishing an association between terminal devices. The method includes the following actions. A first terminal device transmits information of terminal capabilities to a network device, the information of terminal capabilities being used to indicate that the first terminal device has capabilities of receiving and forwarding data. The first terminal device receives confirmation information for confirming that the first terminal device has the capabilities of receiving and forwarding data, from the network device. The first terminal device establishes an association with a second terminal device according to the confirmation information.

Alternatively, the first terminal device may receive data from a base station and forward the received data to other terminal devices, and the first terminal device may further receive data from other terminal devices and forward the received data to the base station.

It should be noted that establishment of the association between terminal devices may be understood as information to be exchanged by the two terminal devices. Such information may include, for example, a device type, a device identifier (ID), a data transmitting period, a requirement of data for delay, and the like. Associated terminal devices are capable of communicating with each other.

Therefore, according to the method for establishing the association between terminal devices in the embodiment of the disclosure, based on an existing LTE communication system, an association between terminal devices can be established for data transmission, so as to save the power of the terminal devices and reduce the cost for communication between the terminal devices, and data of the terminal device may also be transmitted to a network, so that a user can share or acquire required information anytime and anywhere.

Based on the first aspect, in a first possible implementation of the first aspect, the action that the first terminal device establishes, according to the confirmation information, an association with a second terminal device includes the following actions. After receiving the confirmation information, the first terminal device receives association request information from the second terminal device and presents the information to a user, the association request information carrying device information of the second terminal device. The first terminal device receives response information determined according to the device information of the second terminal device and input by the user, the response information being used to indicate to the first terminal device whether to establish the association with the second terminal device. When the response information indicates establishing the association with the second terminal device by the first terminal device, the first terminal device establishes the association with the second terminal device.

Based on the first aspect, in a second possible implementation of the first aspect, the action that the first terminal device establishes, according to the confirmation information, an association with a second terminal device includes the following actions. After receiving the confirmation information, the first terminal device receives association request information from the second terminal device, the association request information carrying device information of the second terminal device. The first terminal device determines, according to the stored association information and the device information of the second terminal device, whether to establish an association with the second terminal device. When the first terminal device determines to establish an association with the second terminal device, the first terminal device establishes an association with the second terminal device.

Based on the first possible implementation of the first aspect, in a third possible implementation of the first aspect, after the first terminal device receives the confirmation information, the method further includes that he first terminal device transmits first resource allocation indication information. The action that the first terminal device receives association request information from the second terminal device includes that the first terminal device receives the association request information on resources indicated by the first resource allocation indication information.

Alternatively, the first terminal device may be pre-configured with a dedicated resource or shared resource pool, and the first terminal device may perform, based on the pre-configured dedicated resource or shared resource, resource allocation scheduling on a terminal device associated with the first terminal device.

Based on the third possible implementation of the first aspect, in a fourth possible implementation of the first aspect, the method further includes that the first terminal device receives second resource allocation indication information from the network device. Resources indicated by the second resource allocation indication information include the resources indicated by the first resource allocation indication information.

Or, it can be understood that the network device may configure resources for the first terminal device through the second resource allocation indication information, and the resources may be used by the first terminal device to establish association and data communication with different terminal devices.

Based on the first aspect and any one of the first to fourth possible implementations of the first aspect, in a fifth possible implementation of the first aspect, the method further includes the following actions. The first terminal device receives a cluster ID from the network device, the cluster ID being used to temporarily identify a cluster to which the first terminal device pertains, the cluster ID being allocated to the first terminal device when the network device determines that the first terminal device has capabilities of receiving and forwarding data. The first terminal device transmits the cluster ID to the second terminal device, so that the second terminal device determines, before transmitting data to the first terminal device or receiving data from the first terminal device, according to the cluster ID, whether the first terminal device is accessible and resources occupied during data transmission or reception.

That is, when determining that the first terminal device has data receiving and forwarding functions, the network device allocates an identifier to the first terminal device, where the identifier may identify a cluster to which the first terminal device temporarily pertains.

Based on the first aspect and any one of the first to fifth possible implementations of the first aspect, in a sixth possible implementation of the first aspect, the method further includes the following actions. The first terminal device receives data from the second terminal device. The first terminal device transmits the data to the network device according to the state of the first terminal device and Quality of Service (QoS) indication information, the QoS indication information indicating the requirements of the data for QoS.

When receiving data from the second terminal device, the first terminal device may select to transmit the received data to the network, so that the user may share or acquire the required information anytime and anywhere.

Based on the sixth possible implementation of the first aspect, in a seventh possible implementation of the first aspect, the action that the first terminal device transmits the data to the network device according to the state of the first terminal device and QoS indication information includes the following actions. When the first terminal device is in a connected state, the first terminal device transmits the data to the network device within a first duration since the data is successfully received. When the first terminal device is in an idle state and the QoS indication information indicates that the data is delay-sensitive data or the transmission delay required by the data is less than a first preset value, the first terminal device establishes connection with the network device within a second duration since the data is successfully received, and transmits the data to the network device after the connection is established. When the first terminal device is in an idle state and the QoS indication information indicates that the data is delay-insensitive data, and when the first terminal device has established connection with the network device within a third duration since the data is successfully received, the first terminal device transmits the data to the base station. When the first terminal device is in an idle state and the QoS indication information indicates that the data has no requirement on the transmission delay, and when the first terminal device has established connection with the network device according to a service demand of the first terminal device within a fourth duration since the data is successfully received, the first terminal device transmits the data to the network device.

Alternatively, the second terminal device may notify the first terminal device whether data (or information) to be transmitted is delay-sensitive information and/or carries a delay requirement when establishing an association with the first terminal device.

Based on the sixth or seventh possible implementation of the first aspect, in an eighth possible implementation of the first aspect, the action of receiving data from the second terminal device includes receiving data from the second terminal device and the QoS indication information.

In other words, the second terminal device may carry the requirements of data for QoS, such as whether the data is delay-sensitive data and/or data carrying delay requirements, while transmitting data to the first terminal device.

Based on the first aspect and any one of the first to eighth possible implementations of the first aspect, in a ninth possible implementation of the first aspect, the action that the first terminal device transmits information of terminal capabilities to the network device includes at least one of the following actions. The first terminal device transmits an Access Stratum (AS) signaling to the base station, the AS signaling carrying the information of terminal capabilities. Or, the first terminal device transmits a Non-Access Stratum (NAS) signaling to a core network device, the NAS signaling carrying the information of terminal capabilities.

Alternatively, the first terminal device may transmit a connection establishment request message or a connection establishment complete message to the base station, the connection establishment request message or the connection establishment complete message carrying the information of terminal capabilities, and the base station forwards the received information of terminal capabilities to the core network device, so that the core network device determines whether the first terminal device has capabilities of receiving and forwarding data.

Based on the first or second possible implementation of the first aspect, in a tenth possible implementation of the first aspect, the device information of the second terminal device includes at least one of the following information: an ID of the second terminal device, the type of the second terminal device, the data transmitting period of the second terminal device, or QoS indication information.

Based on the third possible implementation of the first aspect, in an eleventh possible implementation of the first aspect, the action that the first terminal device transmits the cluster ID to the second terminal device includes that the first terminal device transmits a broadcast message to the second terminal device, the broadcast message carrying the cluster ID.

Based on the eleventh possible implementation of the first aspect, in a twelfth possible implementation of the first aspect, the broadcast message further carries device information of the first terminal device, the device information of the first terminal device including at least one of type information or power information.

The type information may specifically indicate that the first terminal device is a smart terminal or a non-smart terminal, and the power information may indicate whether the first terminal device is in a high-power state or a low-power state, or directly indicate the amount of power of the first terminal device.

A second aspect provides a method for establishing an association between terminal devices. The method includes the following actions. A second terminal device receives a cluster ID from a first terminal device, the cluster ID being used to temporarily identify a cluster to which the first terminal device pertains, the cluster ID being allocated to the first terminal device and transmitted to the first terminal device when a network device determines that the first terminal device has capabilities of receiving and forwarding data. The second terminal device transmits association request information to the first terminal device, the association request information carrying device information of the second terminal device. When receiving association confirmation information from the first terminal device, the second terminal device stores the cluster ID to establish an association with the first terminal device, the association confirmation information is transmitted to the second terminal device by the first terminal device when a user or the first terminal device determines, according to the device information, to establish an association between the first terminal device and the second terminal device.

Alternatively, the second terminal device receives a broadcast message from the first terminal device. The broadcast message carries the cluster ID, and the broadcast message may further carry device information of the first terminal device, the device information of the first terminal device including at least one of type information and power information. The type information may specifically indicate that the first terminal device is a smart terminal or a non-smart terminal, and the power information may indicate whether the first terminal device is in a high-power state or a low-power state, or directly indicate the amount of power of the first terminal device.

Therefore, according to the method for establishing an association between terminal devices in the embodiment of the disclosure, an association between a terminal device and another terminal device can be established based on an existing LTE communication system for data transmission, so as to save the power of the terminal devices and reduce the cost for communication between terminal devices, and data of the terminal device may also be transmitted to a network, so that a user can share or acquire required information anytime and anywhere.

Based on the second aspect, in a first possible implementation of the second aspect, the method further includes that the second terminal device transmits, according to a relationship between a detected cluster ID and the cluster ID, data to the first terminal device.

Based on the first possible implementation of the second aspect, in a second possible implementation of the second aspect, the action that the second terminal device transmits, according to a relationship between a detected cluster ID and the cluster ID, data to the first terminal device includes the following actions. When the cluster ID detected by the second terminal device includes the cluster TD and the first terminal device is of a target type, the second terminal device transmits data to the first terminal device. When the cluster ID detected by the second terminal device includes the cluster ID and the capability of the first terminal device is higher than the capability of a terminal device corresponding to other cluster IDs in the detected cluster ID, the second terminal device transmits data to the first terminal device.

For example, when a smart terminal exists in multiple cluster IDs detected by the second terminal device, the smart terminal may preferably perform data transmission, or if there are multiple smart terminal devices or multiple non-smart terminal devices in terminal devices corresponding to multiple cluster IDs detected by the second terminal device, the second terminal device may select a terminal device for data transmission according to the capability, power and the like of the terminal device.

For example, a terminal device having power greater than a preset value and having a transmission capability supporting LTE may be selected for data transmission. And if there are multiple terminal devices having equivalent capabilities, one terminal device may be randomly selected for data transmission.

Based on the second aspect and any one of the first and second possible implementations of the second aspect, in a third possible implementation of the second aspect, the method further includes that the second terminal device receives first resource indication information from the first terminal device. The action that the second terminal device transmits association request information to the first terminal device includes that the second terminal device transmits the association request information to the first terminal device on resources indicated by the first resource indication information.

Based on the first or second possible implementation of the second aspect, in a fourth possible implementation of the first aspect, the method further includes that the second terminal device receives the cluster ID and second resource indication information corresponding to the cluster ID from a base station. The action that the second terminal device transmits association request information to the first terminal device includes the following actions. The second terminal device receives third resource allocation indication information from the first terminal device and corresponding to the cluster ID, resources indicated by the third resource allocation indication information being some of resources indicated by the second resource allocation indication information. The second terminal device transmits the association request information to the first terminal device over the resources indicated by the third resource allocation indication information.

The action that the second terminal device transmits data to the first terminal device includes that the second terminal device transmits the data to the first terminal device over the resources indicated by the second resource indication information.

It can be understood that the resource allocation indication information from the base station to the second terminal device is identified by using the cluster ID, and the second terminal device may determine, according to the resource allocation indication information carrying the cluster ID, a terminal device for data transmission and resources occupied when transmitting data to the terminal device or receiving data from the terminal device.

A third aspect provides a method for establishing an association between terminal devices. The method includes the following actions. A base station receives information of terminal capabilities from a first terminal device, the information of terminal capabilities being used to indicate that the first terminal device has capabilities of receiving and forwarding data. The base station transmits the information of terminal capabilities to a core network device. The base station receives confirmation information for confirming that the first terminal device has capabilities of receiving and forwarding data, from the core network device. The base station transmits the confirmation information to the first terminal device, so that the first terminal device establishes, according to the confirmation information, an association with a second terminal device.

Therefore, according to the method for establishing an association between terminal devices in the embodiment of the disclosure, an association between terminal devices can be established based on an existing LTE communication system for data transmission, so as to save the power of the terminal devices and reduce the cost for communication between terminal devices, and data of the terminal device may also be transmitted to a network, so that a user can share or acquire required information anytime and anywhere.

Based on the third aspect, in a first possible implementation of the third aspect, the method further includes the following actions. The base station receives a cluster ID from the core network device, the cluster ID being used to temporarily identify a cluster to which the first terminal device pertains, the cluster ID being determined by the core network device when determining that the first terminal device has capabilities of receiving and forwarding data. The base station transmits the cluster ID to the first terminal device.

Based on the third aspect or the first possible implementation of the third aspect, in a second possible implementation of the third aspect, the action that the base station receives information of terminal capabilities from the first terminal device includes that the base station receives AS signaling from the first terminal device, the AS signaling carrying the information of terminal capabilities.

Based on the third aspect and any one of the first and second possible implementations of the third aspect, in a third possible implementation of the third aspect, the method further includes that, the base station transmits first resource allocation indication information to the first terminal device, so that the first terminal device allocates some resources of resources indicated by the first resource allocation indication information to the second terminal device.

Based on the third aspect and any one of the first and second possible implementations of the third aspect, in a fourth possible implementation of the third aspect, the method further includes that, the base station transmits the cluster ID and second resource allocation indication information corresponding to the cluster ID to the second terminal device, so that the second terminal device determines, according to the cluster ID, resources occupied when transmitting data to the first terminal device or receiving data from the first terminal device.

A fourth aspect provides a method for establishing an association between terminal devices. The method includes the following actions. A core network device receives information of terminal capabilities of a first terminal device, the information of terminal capabilities being used to indicate that the first terminal device has capabilities of receiving and forwarding data. When the core network device determines, according to the information of terminal capabilities, that the first terminal device has capabilities of receiving and forwarding data, the core network device transmits confirmation information for confirming that the first terminal device has capabilities of receiving and forwarding data to the first terminal device, so that the first terminal device establishes, according to the confirmation information, an association with a second terminal device.

Therefore, according to the method for establishing an association between terminal devices in the embodiment of the disclosure, based on an existing LTE communication system, an association between terminal devices can be established for data transmission, so as to save the power of the terminal devices and reduce the cost for communication between terminal devices, and data of the terminal device may also be transmitted to a network, so that a user can share or acquire required information anytime and anywhere.

Based on the fourth aspect, in a first possible implementation of the fourth aspect, the method further includes the following actions. When the core network device determines, according to the information of terminal capabilities, that the first terminal device has capabilities of receiving and forwarding data, the core network device determines a cluster ID to be allocated to the first terminal device, the cluster ID being used to temporarily identify a cluster to which the first terminal device pertains. The core network device transmits the cluster ID to the first terminal device.

Based on the first possible implementation of the fourth aspect, in a second possible implementation of the fourth aspect, the action that the core network device determines a cluster ID allocated to the first terminal device includes that, the core network device determines a cluster ID generated according to an International Mobile Subscriber Identification Number (IMSI) or an International Mobile Device Identity (IMEI) of the first terminal device to be the cluster ID.

Based on the fourth aspect and any one of the first and second possible implementations of the fourth aspect, in a third possible implementation of the fourth aspect, the action that the core network device receives information of terminal capabilities of the first terminal device includes one of the following actions. The core network device receives NAS signaling from the first terminal device, the NAS signaling carrying the information of terminal capabilities. The core network device receives the information of terminal capabilities from a base station.

A fifth aspect provides a terminal device for performing the method in the first aspect or any possible implementation of the first aspect. Specifically, the terminal device includes a unit for performing the method in the first aspect or any possible implementation of the first aspect.

A sixth aspect provides a terminal device for performing the method in the second aspect or any possible implementation of the second aspect. Specifically, the terminal device includes a unit for performing the method in the second aspect or any possible implementation of the second aspect.

A seventh aspect provides a base station for performing the method in the third aspect or any possible implementation of the third aspect. Specifically, the base station includes a unit for performing the method in the third aspect or any possible implementation of the third aspect.

An eighth aspect provides a core network device for performing the method in the fourth aspect or any possible implementation of the fourth aspect. Specifically, the core network device includes a unit for performing the method in the fourth aspect or any possible implementation of the fourth aspect.

A ninth aspect provides a terminal device, which includes a processor, a memory, a receiver, and a transmitter. The processor, the memory, the receiver and the transmitter are connected through a bus system, the memory is configured to store instructions, and the processor is configured to execute the instructions stored in the memory to control the receiver to receive information and to control the transmitter to transmit information, such that the terminal device performs the method in the first aspect or any possible implementation of the first aspect.

A tenth aspect provides a terminal device, which includes a processor, a memory, a receiver, and a transmitter. The processor, the memory, the receiver and the transmitter are connected through a bus system, the memory is configured to store instructions, and the processor is configured to execute the instructions stored in the memory to control the receiver to receive information and to control the transmitter to transmit information, such that the terminal device performs the method in the second aspect or any possible implementation of the second aspect.

An eleventh aspect provides a base station, which includes a processor, a memory, a receiver, and a transmitter. The processor, the memory, the receiver and the transmitter are connected through a bus system, the memory is configured to store instructions, and the processor is configured to execute the instructions stored in the memory to control the receiver to receive information and to control the transmitter to transmit information, such that the terminal device performs the method in the third aspect or any possible implementation of the third aspect.

A twelfth aspect provides a core network device, which includes a processor, a memory, a receiver, and a transmitter. The processor, the memory, the receiver and the transmitter are connected through a bus system, the memory is configured to store an instruction, and the processor is configured to execute the instruction stored in the memory to control the receiver to receive information and to control the transmitter to transmit information, such that the terminal device performs the method in the fourth aspect or any possible implementation of the fourth aspect.

BRIEF DESCRIPTION OF DRAWINGS

In order to describe the technical solutions in the embodiments of the disclosure more clearly, the drawings required to be used in descriptions about the embodiments or the conventional art will be simply introduced below. Obviously, the drawings in the following descriptions are only some embodiments of the disclosure. Those of ordinary skilled in the art may further obtain other drawings according to these drawings without creative work.

DETAILED DESCRIPTION

The technical solutions in the embodiments of the disclosure are clearly and completely described in the following with reference to the accompanying drawings in the embodiments of the disclosure. It is apparent that the described embodiments are a part of the embodiments of the disclosure, but not all of the embodiments. All other embodiments obtained by those skilled in the art based on the embodiments of the disclosure without creative efforts fall within the scope of protection of the disclosure.

The technical solution of the embodiment of the disclosure may be applied to various communication systems such as an LTE system, an LTE Frequency Division Duplex (FDD) system, an LTE Time Division Duplex (TDD) system, a UMTS, and future 5G communication systems.

In the embodiment of the disclosure, a terminal device may also be called a user device, a Mobile Station (MS), a mobile terminal, etc. The user device may communicate with one or more core networks through a Radio Access Network (RAN). For example, the user device may be a mobile phone (or "cellular" phone), a computer with a mobile terminal, etc. For example, it is a portable, pocket-sized, handheld, computer-built or on-vehicle mobile device, as well as terminal devices in a future 5G network or terminal devices in a future evolved Public Land Mobile Network (PLMN).

In the embodiment of the disclosure, a network device may be a device for communicating with the user device, and the network device may be an Evolutional Node B (eNB or eNodeB) in the LTE system. Or, the network device may be a relay station, an access point, an in-vehicle device, a wearable device, and a network device in a future 5G network or a network device in a future evolved PLMN.

Figure 1:
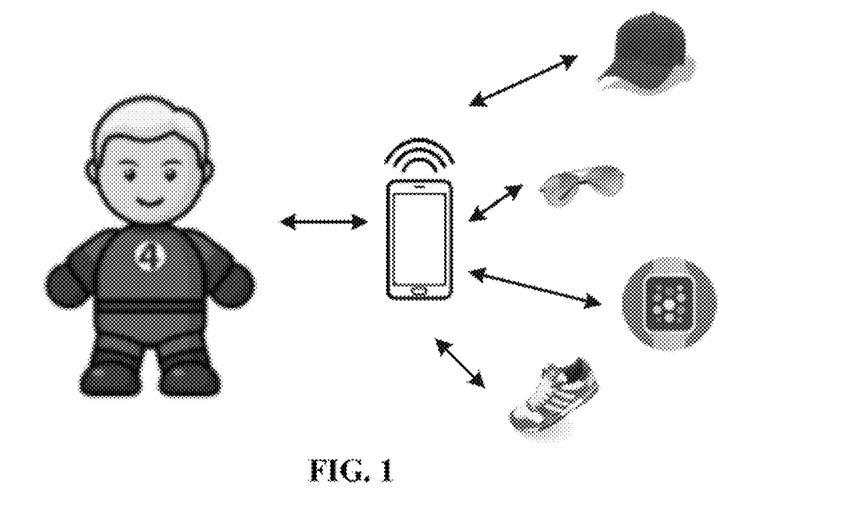
FIG. 1 illustrates a schematic diagram of an application scenario according to an embodiment of the disclosure.

FIG. 1 illustrates an application scenario of an embodiment of the disclosure. As illustrated in FIG. 1, in addition to a traditional mobile phone, a human-centered network includes terminal devices such as glasses, hats, smart watches, and shoes. These terminals may use sensors, cameras, earpieces and other devices to maximize the human hearing, vision, taste, smell and touch, thus providing a more intimate service and experience for a person.

As illustrated in FIG. 1, the mobile phone has the characteristics of strong capability and sufficient power compared to other terminal devices. Therefore, the mobile phone may collect information of other terminal devices and transmit them to the network, so that a user may share or acquire required information anytime and anywhere.

It should be understood that the devices illustrated in FIG. 1 are not intended to limit the scope of protection of the disclosure.

Figure 2:
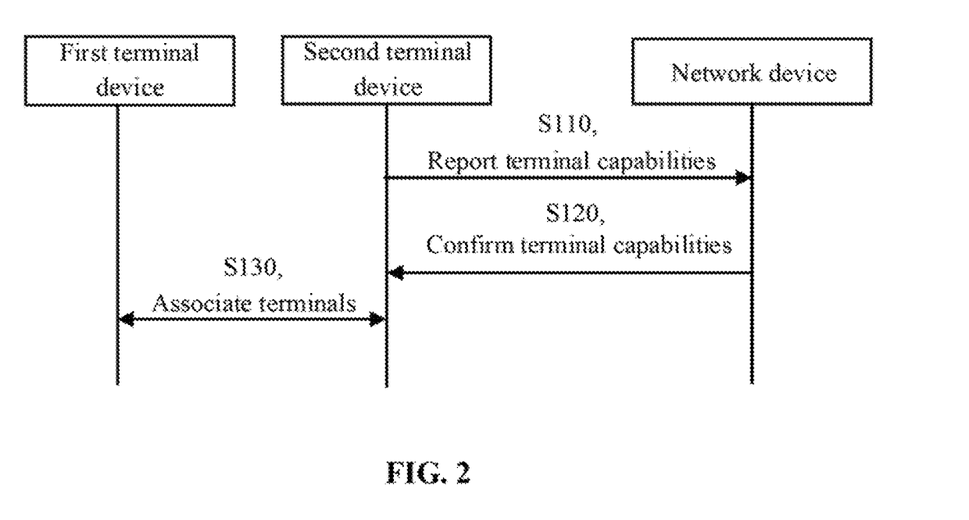
FIG. 2 illustrates a schematic flowchart of a method for establishing an association between terminal devices according to an embodiment of the disclosure.

FIG. 2 illustrates a method for establishing an association between terminal devices according to an embodiment of the disclosure. As illustrated in FIG. 2, the method 100 includes the actions as follows.

In S110, a first terminal device reports terminal capability to a network device.

After obtaining the permission of a user, the first terminal device reports to the network device that first terminal device has capabilities of receiving and forwarding data. Generally, the first terminal device may transmit information of terminal capabilities to a base station through AS signaling carrying the information of terminal capabilities. For example, the first terminal device may report the terminal capability to the base station by carrying the information of terminal capabilities in a connection establishment request message or a connection establishment complete message. After receiving the information of terminal capabilities, the base station may forward the information of terminal capabilities to a core network device (such as a Mobile Management Entity (MME)). After receiving the information of terminal capabilities, the core network device verifies the capability of the first terminal device, and confirms whether the first terminal device has capabilities of receiving and forwarding data. The first terminal device may also directly report first terminal device's own capabilities to the core network device by carrying the information of terminal capabilities in NAS signaling. The first terminal device may also report the terminal capability to the core network device through the NAS signaling while reporting the terminal capability to the base station through the AS signaling.

Alternatively, the information of terminal capabilities transmitted by the first terminal device may be displayed to indicate that the first terminal device has the capabilities of receiving and forwarding data, or the information of terminal capabilities may be in an implicit indication manner. For example, the information of terminal capabilities may be the power of the first terminal device, and the core network device determines the capability of the first terminal device according to the power of the first terminal device, but the disclosure is not limited thereto.

In S120, the network device transmits terminal capability confirmation information to the first terminal device.

The core network device confirms whether the first terminal device is legal and has capabilities of receiving and forwarding data, and the core network device feeds back an confirmation to the first terminal device when confirming that the first terminal device is legal and has capabilities of receiving and forwarding data.

The core network device transmits confirmation information for confirming that the first terminal device has capabilities of receiving and forwarding data to the base station, and the base station forwards the confirmation information to the first terminal device.

Further, the base station may further indicate resources allocated by the base station to the first terminal device to the first terminal device, while forwarding the confirmation information to the first terminal device.

Alternatively, the core network device allocates a cluster ID to the first terminal device when the first terminal device has the capabilities of receiving and forwarding data, the cluster ID temporarily identifying a cluster to which the first terminal device pertains. Alternatively, the core network device may generate the cluster ID based on an IMSI or an IMEI of the first terminal device, and the cluster ID uniquely identifies the cluster to which the first terminal device pertains.

After determining the cluster ID to be allocated to the first terminal device, the core network device may directly transmit the cluster ID to the first terminal device through NAS signaling, or the core network device may transmit the cluster ID to the base station, and the base station may forward the cluster ID to the first terminal device.

After receiving the cluster ID, the first terminal device may inform a neighboring terminal of the cluster ID in a broadcasting manner. Alternatively, the broadcast message may further carry type information of the first terminal device such as a smart terminal/non-smart terminal, power information such as high-power or low-power. Before transmitting data to the first terminal device or receiving data from the first terminal device, the neighboring terminal may determine, according to the cluster ID, whether the first terminal device is accessible and resources occupied during the data transmission or reception.

In the embodiment of the disclosure, alternatively, a group of terminal devices that have the same cluster ID may form a cluster, and the terminal device having the capabilities of receiving and forwarding data in the cluster may be called a "cluster terminal".

In S130, the first terminal device associates and communicates with a second terminal device.

In S130, the first terminal device receives association request information from the second terminal device. The association request information carries device information of the second terminal. The device information of the second terminal includes, but is not limited to, the ID of the second terminal device, the type of the second terminal device, the data transmitting period of the second terminal device, and QoS indication information. After the first terminal device receives the association request information of the second terminal device, a user controls the first terminal device to establish or not to establish an association with the second terminal device according to the association request information.

Specifically, the user determines, according to the device information of the second terminal device, whether he/she would like the first terminal device to establish an association with the second terminal device, and inputs, in the first terminal device, response information indicating whether to establish an association with the second terminal device by the first terminal device. For example, if the second terminal device belongs to the user, the user would like the first terminal device to establish an association with the second terminal device, the user inputs response information in the first terminal device, and the response information indicates associating the first terminal device and the second terminal device. Then, the first terminal device stores the device information of the second terminal device, and transmits association confirmation information to the second terminal device. After receiving the association confirmation information from the first terminal device, the second terminal device stores the device information and the cluster ID transmitted by the first terminal device. When determining that there is data to be transmitted to the first terminal device, resource allocation indication information transmitted by the first terminal device is to be received again, so that the data will be transmitted on resources indicated by the resource allocation indication information.

Or, after receiving the association request information from the second terminal device, the first terminal device determines whether to establish an association with the second terminal device according to the stored association information and the device information carried in the association request information. For example, the association information may record the information of device previously associated with the first terminal device, such as the ID of the device. If the first terminal device finds that the ID of the second terminal device is recorded in the association information by comparison, it indicates that an association with the second terminal device had been established before and the first terminal device establishes an association with the second terminal device. If the ID of the second terminal device is not in the association information, it indicates that no association with the second terminal device had been established before, the first terminal device may choose not to associate with the second terminal device.

Alternatively, the second terminal device receives first resource allocation indication information from the first terminal device, and transmits association request information to the first terminal device on resources indicated by the first resource allocation indication information when transmitting the association request information to the first terminal device.

Alternatively, the second terminal device receives the cluster ID and second resource allocation indication information corresponding to the cluster ID from the base station. When the second terminal device receives the second resource allocation indication information, the second terminal device become aware of resources indicated by the second resource indication information being used for communication between the second terminal device and the first terminal device, so that the second terminal device transmits the association request information to the first terminal device on the resources indicated by the second resource allocation indication information, and transmits data to the first terminal device or receives data from the first terminal device on the resources indicated by the second resource allocation indication information. In the embodiment of the disclosure, alternatively, the second terminal device may store cluster IDs and device information corresponding to multiple terminal devices having data receiving and forwarding functions. At this time, the second terminal device may transmit data to a corresponding terminal device according to the detected cluster ID and corresponding resource allocation indication information during data transmitting. For example, if a smart terminal device exists in terminal devices corresponding to cluster IDs detected by the second terminal device, the smart terminal device may preferably perform data transmission, or if there are multiple smart terminal devices in terminal devices corresponding to cluster IDs detected by the second terminal device, a terminal device is selected for data transmission according to the capability, power and the like of the terminal device. For example, a smart terminal device having a state of charge (SOC) greater than a preset value and having a transmission capability supporting the LTE may be selected for data transmission. If multiple terminal devices in terminal devices corresponding to cluster IDs detected by the terminal device have equal capabilities, any one of the terminal devices may be randomly selected for data transmission.

Further, after receiving the data from the second terminal device, the first terminal device may transmit data to the network device according to the state of the first terminal device and the requirement of the data for QoS. Alternatively, the second terminal device may notify the first terminal device of the requirement of the data for QoS in the process of establishing an association with the first terminal device, or the second terminal device may notify the first terminal device of the requirement of the data for QoS when transmitting data to the first terminal device. The disclosure does not make limitations on this.

Alternatively, when the first terminal device is in a connected state, the received data may be reported to the network device. When the first terminal device is in an idle state and the data is delay-sensitive information, the first terminal device immediately establishes connection and reports the data. When the first terminal device is in an idle state and the data is delay-insensitive data, the first terminal device waits for the connection to be established according to the first terminal device's own service, and then reports the data. When the first terminal device is in an idle state and the data carries a requirement for delay (for example, 100 ms, 1 s, or 1 minute), the first terminal device establishes connection according to the requirement for delay, and reports the data. In the process, the connection establishment for the first terminal device's own service may be adopted passingly. When the first terminal device is in an idle state and the data has no requirement for delay, the first terminal device may report the data after the connection establishment for the first terminal device's own service. When a time period for which the data has been stored in the first terminal device exceeds a preset duration, the first terminal device may delete the data.

Figure 3:
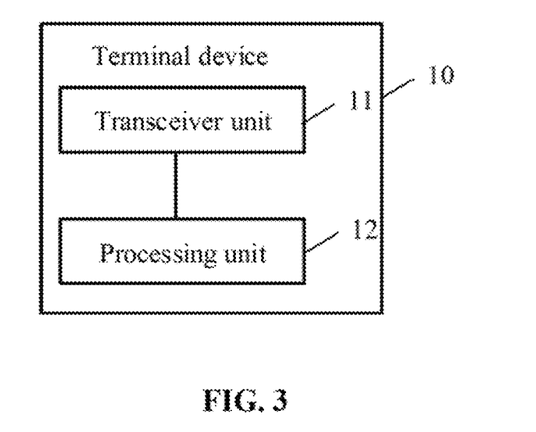
FIG. 3 illustrates a schematic block diagram of a terminal device according to an embodiment of the disclosure.

The method for establishing an association between terminal devices according to an embodiment of the disclosure is described in detail in connection with FIG. 2, and a terminal device 10 according to an embodiment of the disclosure will be described in detail below in connection with FIG. 3. As illustrated in FIG. 3, the terminal device 10 includes a transceiver unit 11 and a processing unit 12.

The transceiver unit 11 may be configured to transmit information of terminal capabilities to a network device. The information of terminal capabilities may be used to indicate that the terminal device has the capabilities of receiving and forwarding data.

The transceiver unit 11 may further be configured to receive confirmation information for confirming that the terminal device has capabilities of receiving and forwarding data, from the network device.

The processing unit 12 may be configured to establish an association with a second terminal device according to the confirmation information.

Therefore, according to the terminal device in the embodiment of the disclosure, based on the existing LTE communication system, an association between terminal devices can be established for data transmission, so as to save the power of the terminal devices and reduce the cost for communication between terminal devices, and data of the terminal device may also be transmitted to a network, so that a user can share or acquire required information anytime and anywhere.

In the embodiment of the disclosure, alternatively, the transceiver unit 11 may further be configured to, after receiving the confirmation information, receive association request information from the second terminal device and present the information to a user, the association request information carrying device information of the second terminal device, and receive response information input by the user and determined according to the device information of the second terminal device, the response information being used to indicate, to the terminal device, whether to establish the association with the second terminal device.

The processing unit 12 may specifically be configured to, when the response information indicates establishing the association with the second terminal device by the terminal device, establish an association with the second terminal device.

In the embodiment of the disclosure, alternatively, the transceiver unit 11 may further be configured to, after receiving the confirmation information, receive association request information from the second terminal device, the association request information carrying device information of the second terminal device.

The processing unit 12 may specifically be configured to, determine whether to establish an association with the second terminal device according to the stored association information and the device information of the second terminal device; and when determining to establish the association with the second terminal device, establish the association with the second terminal device.

The processing unit 12 may specifically be configured to, determine whether to establish an association with the second terminal device according to the stored association information after the transceiver unit 11 receives the confirmation information; and establish the association with the second terminal device when the processing unit 12 determines to establish the association with the second terminal device.

In the embodiment of the disclosure, alternatively, after the transceiver unit 11 receives the confirmation information, the transceiver unit 11 may further be configured to transmit first resource allocation indication information to the second terminal device, and receive the association request information on resources indicated by the first resource allocation indication information.

In the embodiment of the disclosure, alternatively, the transceiver unit 11 may further be configured to receive second resource allocation indication information from the network device. Resources indicated by the second resource allocation indication information include the resources indicated by the first resource allocation indication information.

In the embodiment of the disclosure, alternatively, the transceiver unit 11 may further be configured to receive a cluster ID from the network device, and transmit the cluster ID to the second terminal device, so that the second terminal device determines, before transmitting data to the terminal device or receiving data from the terminal device, according to the cluster ID, whether the terminal device is accessible and resources occupied during data transmission or reception. Here, the cluster ID may be used to temporarily identify a cluster to which the terminal device pertains, and the cluster ID may be allocated to the first terminal device when the network device determines that the terminal device has capabilities of receiving and forwarding data.

In the embodiment of the disclosure, alternatively, the transceiver unit 11 may further be configured to receive data from the second terminal device, and transmit the data to the network device according to the state of the terminal device and QoS indication information, the QoS indication information indicating a requirement of the data for QoS.

In the embodiment of the disclosure, alternatively, the transceiver unit 11 may specifically be configured to, when the terminal device is in a connected state, transmit the data to the network device within a first duration since the data is successfully received.

Alternatively, the transceiver unit 11 may specifically be configured to, when the terminal device is in an idle state and the QoS indication information indicates that the data is delay-sensitive data or the transmission delay required by the data is less than a first preset value, the processing unit 12 establishes connection with the network device within a second duration since the transceiver unit 11 successfully receives the data, and the transceiver unit 11 is configured to transmit the data to the network device after the connection is established.

Alternatively, the transceiver unit 11 may specifically be configured to, when the terminal device is in an idle state and the QoS indication information indicates that the data is delay-insensitive data, and when the processing unit 12 has established connection with the network device within a third duration since the transceiver unit 11 successfully receives the data, the transceiver unit 11 transmits the data to the base station.

Alternatively, the transceiver unit 11 may specifically be configured to, when the terminal device is in an idle state and the QoS indication information indicates that the data has no requirement on the transmission delay, and when the processing unit 12 has established connection with the network device according to a service demand of the first terminal device within a fourth duration since the transceiver unit 11 successfully receives the data, the transceiver unit 11 may be configured to transmit the data to the network device.

In the embodiment of the disclosure, alternatively, the transceiver unit 11 may specifically be configured to receive data and the QoS indication information from the second terminal device.

In the embodiment of the disclosure, alternatively, the transceiver unit 11 may specifically be configured to transmit AS signaling to the base station, and/or, transmit NAS signaling to a core network device, the AS signaling carrying the information of terminal capabilities, the NAS signaling carrying the information of terminal capabilities.

In the embodiment of the disclosure, alternatively, the device information of the second terminal device includes at least one of the following information: an ID of the second terminal device, the type of the second terminal device, the data transmitting period of the second terminal device, or QoS indication information.

In the embodiment of the disclosure, alternatively, the transceiver unit 11 may specifically be configured to transmit a broadcast message to the second terminal device, the broadcast message carrying the cluster ID.

In the embodiment of the disclosure, alternatively, the broadcast message further carries device information of the terminal device, the device information of the terminal device including at least one of type information or power information.

Figure 4:
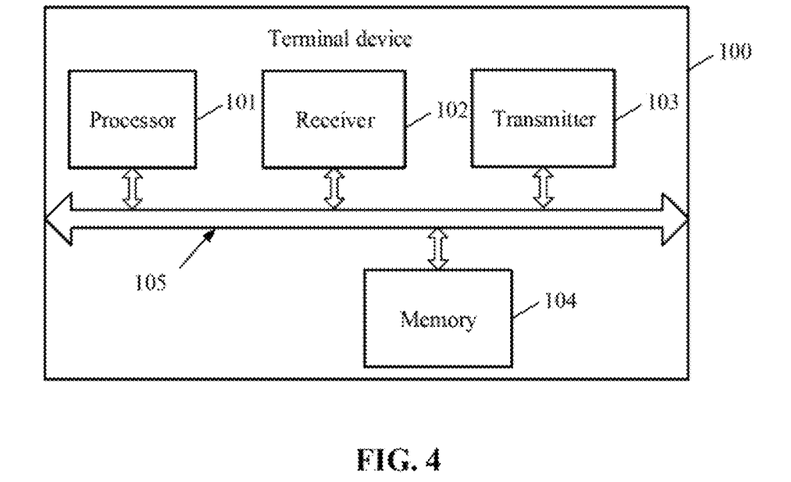
FIG. 4 illustrates a schematic block diagram of a terminal device according to another embodiment of the disclosure.

It should be noted that in the embodiment of the disclosure, the processing unit 12 may be implemented by a processor, and the transceiver unit 11 may be implemented by a receiver and a transmitter. As illustrated in FIG. 4, the terminal device 100 may include a processor 101, a receiver 102, a transmitter 103, and a memory 104. The memory 104 may be used to store a code and the like executed by the processor 101.

Various components in the terminal device 100 are coupled together by a bus system 105. In addition to a data bus, the bus system 105 includes a power bus, a control bus, and a status signal bus.

The terminal device 10 illustrated in FIG. 3 or the terminal device 100 illustrated in FIG. 4 can implement various processes implemented by the first terminal device in the foregoing method embodiment. To avoid repetition, details are not described herein again.

Figure 5:
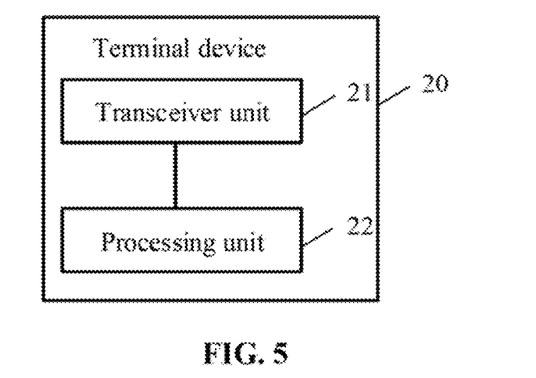
FIG. 5 illustrates a schematic block diagram of a terminal device according to yet another embodiment of the disclosure.

A terminal device according to another embodiment of the disclosure will be described in detail below with reference to FIG. 5. As illustrated in FIG. 5, the terminal device 20 includes a transceiver unit 21 and a processing unit 22.

The transceiver unit 21 may be configured to receive a cluster ID from a first terminal device. The cluster ID may be used to temporarily identify a cluster to which the first terminal device pertains. The cluster ID may be allocated to the first terminal device and transmitted to the first terminal device when a network device determines that the first terminal device has the capabilities of receiving and forwarding data.

The transceiver unit 21 may further be configured to transmit association request information to the first terminal device. The association request information may carry device information of the terminal device.

The processing unit 22 may be configured to, when the transceiver unit 21 receives association confirmation information from the first terminal device, store the cluster ID to establish an association with the first terminal device. The association confirmation information may be transmitted to the terminal device by the first terminal device when a user or the first terminal device determines, according to the device information, to establish an association between the first terminal device and the terminal device.

Therefore, according to the terminal device in the embodiment of the disclosure, based on the existing LTE communication system, an association between terminal devices can be established for data transmission, thus saving the power of the terminal devices and reducing the cost for communication between terminal devices.

In the embodiment of the disclosure, alternatively, the transceiver unit 21 may specifically be configured to transmit data to the first terminal device according to a relationship between one or more detected cluster IDs and the cluster ID.

In the embodiment of the disclosure, alternatively, the transceiver unit 21 may specifically be configured to, when the cluster IDs detected by the second terminal device include the cluster ID and the first terminal device is of a target type, transmit data to the first terminal device. Alternatively, the transceiver unit 21 may specifically be configured to, when the cluster IDs detected by the second terminal device include the cluster ID and a capability of the first terminal device is higher than a capability of each of terminal devices corresponding to other cluster IDs in the detected cluster IDs, transmit data to the first terminal device.

In the embodiment of the disclosure, alternatively, the transceiver unit 21 may further be configured to receive first resource indication information from the first terminal device, and transmit the association request information to the first terminal device on resources indicated by the first resource indication information.

In the embodiment of the disclosure, alternatively, the transceiver unit 21 may further be configured to, receive the cluster ID from a base station and second resource indication information corresponding to the cluster ID; receive third resource allocation indication information from the first terminal device and corresponding to the cluster ID, resources indicated by the third resource allocation indication information being some of resources indicated by the second resource allocation indication information; transmit the association request information to the first terminal device on resources indicated by the third resource indication information; and transmit the data to the first terminal device on resources indicated by the second resource indication information.

Figure 6:
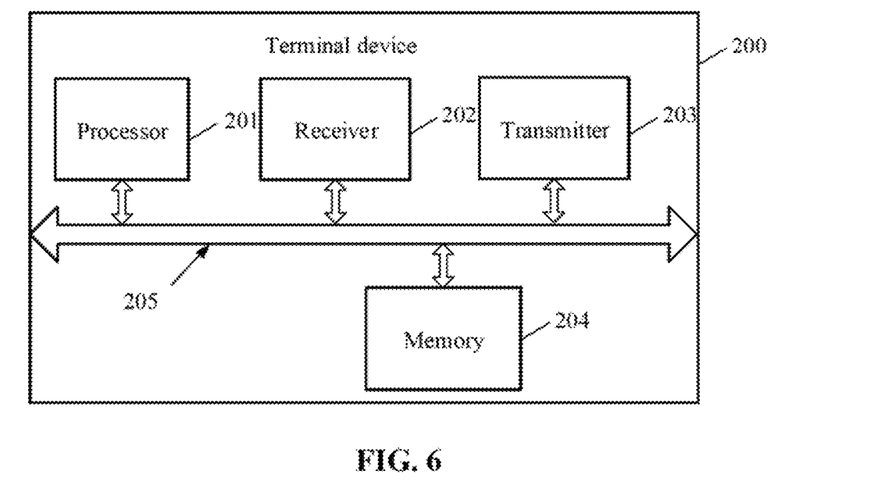
FIG. 6 illustrates a schematic block diagram of a terminal device according to yet another embodiment of the disclosure.

It should be noted that in the embodiment of the disclosure, the processing unit 22 may be implemented by a processor, and the transceiver unit 21 may be implemented by a receiver and a transmitter. As illustrated in FIG. 6, the terminal device 200 may include a processor 201, a receiver 202, a transmitter 203, and a memory 204. The memory 204 may be used to store a code and the like executed by the processor 201.

Various components in the terminal device 200 are coupled together by a bus system 205, wherein in addition to a data bus, the bus system 205 includes a power bus, a control bus, and a status signal bus.

The terminal device 20 illustrated in FIG. 5 or the terminal device 200 illustrated in FIG. 6 can implement various processes implemented by the second terminal device in the foregoing method embodiment. To avoid repetition, details are not described herein again.

Figure 7:
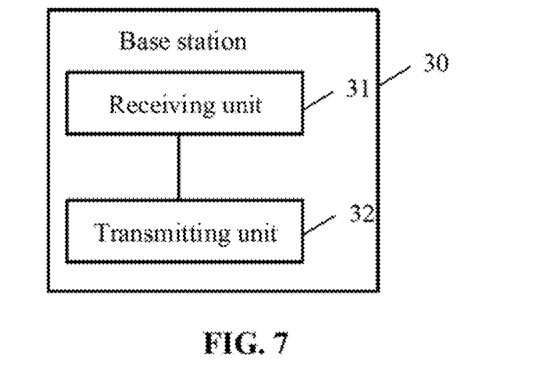
FIG. 7 illustrates a schematic block diagram of a base station according to an embodiment of the disclosure.

A base station according to an embodiment of the disclosure will be described in detail below with reference to FIG. 7. As illustrated in FIG. 7, the base station 30 includes a receiving unit 31 and a transmitting unit 32.

The receiving unit 31 may be configured to receive information of terminal capabilities from a first terminal device. The information of terminal capabilities may be used to indicate that the first terminal device has capabilities of receiving and forwarding data.

The transmitting unit 32 may be configured to transmit the information of terminal capabilities to a core network device.

The receiving unit 31 may further be configured to receive confirmation information confirming that the first terminal device has capabilities of receiving and forwarding data from the core network device.

The transmitting unit 32 may further be configured to transmit the confirmation information to the first terminal device, so that the first terminal device establishes, according to the confirmation information, an association with a second terminal device.

Therefore, the base station of the embodiment of the disclosure receives information of terminal capabilities of a terminal device and forwards the information of terminal capabilities to a core network device, so that the terminal device can establish an association with other terminal devices based on an existing LTE communication system for data transmission, thus saving the power of terminal devices and reducing the cost for communication between terminal devices.

In the embodiment of the disclosure, alternatively, the receiving unit 31 may further be configured to receive a cluster ID from the core network device. The cluster ID may be used to temporarily identify a cluster to which the first terminal device pertains, and the cluster ID may be determined by the core network device when determining that the first terminal device has capabilities of receiving and forwarding data.

The transmitting unit 32 may further be configured to transmit the cluster ID to the first terminal device.

In the embodiment of the disclosure, alternatively, the receiving unit 31 may specifically be configured to receive AS signaling from the first terminal device. The AS signaling may carry the information of terminal capabilities.

In the embodiment of the disclosure, alternatively, the transmitting unit 32 may further be configured to transmit first resource allocation indication information to the first terminal device, so that the first terminal device allocates some resources of resources indicated by the first resource allocation indication information to the second terminal device.

In the embodiment of the disclosure, alternatively, the transmitting unit 32 may further be configured to transmit the cluster ID and second resource allocation indication information corresponding to the cluster ID to the second terminal device, so that the second terminal device determines, according to the cluster ID, resources occupied when transmitting data to the first terminal device or receiving data from the first terminal device.

Figure 8:
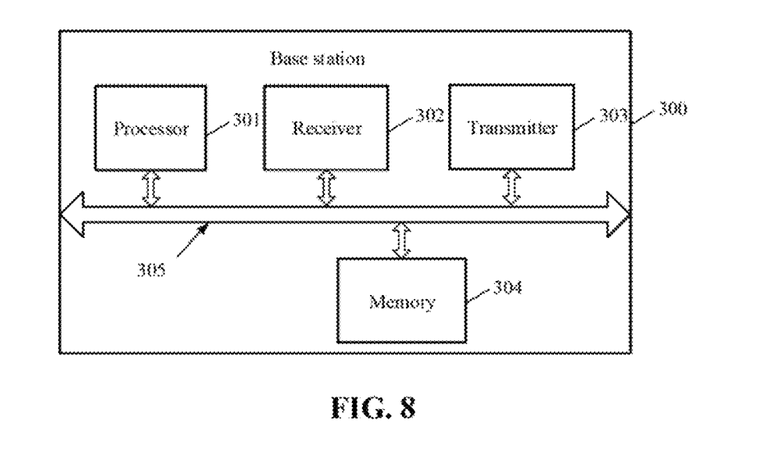
FIG. 8 illustrates a schematic block diagram of a base station according to another embodiment of the disclosure.

It should be noted that in the embodiment of the disclosure, the receiving unit 31 may be implemented by a receiver, and the transmitting unit 32 may be implemented by a transmitter. As illustrated in FIG. 8, the base station 300 may include a processor 301, a receiver 302, a transmitter 303, and a memory 304. The memory 304 may be used to store a code and the like executed by the processor 301.

Various components in the base station 300 are coupled together by a bus system 305, wherein in addition to a data bus, the bus system 305 includes a power bus, a control bus, and a status signal bus.

The base station 30 illustrated in FIG. 7 or the base station 300 illustrated in FIG. 8 can implement various processes implemented by the base station in the foregoing method embodiment. To avoid repetition, details are not described herein again.

Figure 9:
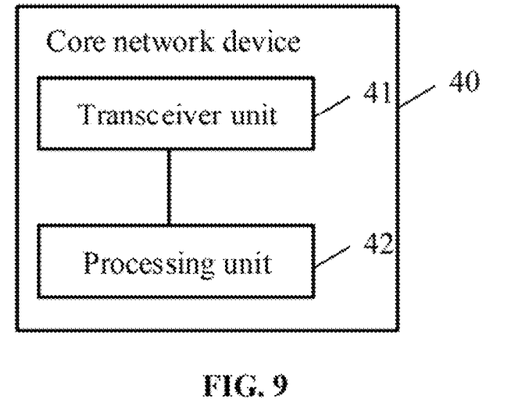
FIG. 9 illustrates a schematic block diagram of a core network device according to an embodiment of the disclosure.

FIG. 9 illustrates a schematic block diagram of a core network device according to an embodiment of the disclosure. As illustrated in FIG. 9, the core network device 40 includes a transceiver unit 41 and a processing unit 42.

The transceiver unit 41 may be configured to receive information of terminal capabilities of a first terminal device. The information of terminal capabilities may be used to indicate that the first terminal device has capabilities of receiving and forwarding data.

The processing unit 42 may be configured to determine, according to the terminal device capability information, whether the first terminal device has the capabilities of receiving and forwarding data.

The transceiver unit 41 may further be configured to, when the processing unit 42 determines, according to the information of terminal capabilities, that the first terminal device has the capabilities of receiving and forwarding data, transmit confirmation information for confirming that the first terminal device has capabilities of receiving and forwarding data to the first terminal device, so that the first terminal device establishes, according to the confirmation information, an association with a second terminal device.

Therefore, the core network device of the embodiment of the disclosure determines, according to information of terminal capabilities of a terminal device, whether the terminal device has the capabilities of receiving and forwarding data, so that the terminal device can establish an association with other terminal devices based on an existing LTE communication system for data transmission, thus saving the power of terminal devices and reducing the cost for communication between terminal devices.

In the embodiment of the disclosure, alternatively, the processing unit 42 may further be configured to, when determining that the first terminal device has capabilities of receiving and forwarding data according to the information of terminal capabilities, determine a cluster ID to be allocated to the first terminal device. The cluster ID may be used to temporarily identify a cluster to which the first terminal device pertains.

The transceiver unit 41 may further be configured to transmit the cluster ID to the first terminal device.

In the embodiment of the disclosure, alternatively, the processing unit 42 may specifically be configured to determine a cluster ID generated according to an IMSI or an IMEI of the first terminal device to be the cluster ID allocated to the first terminal device.

In the embodiment of the disclosure, alternatively, the transceiver unit 41 may specifically be configured to receive NAS signaling from the first terminal device or receive the information of terminal capabilities from a base station. The NAS signaling may carry the information of terminal capabilities.

Figure 10:
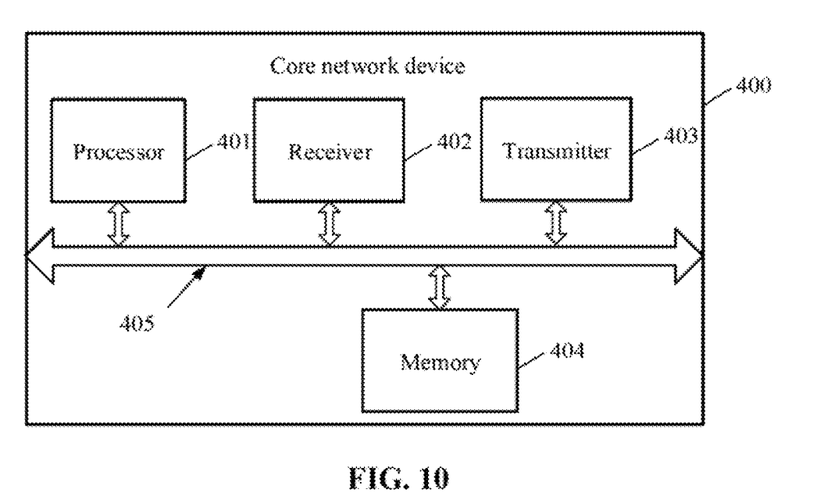
FIG. 10 illustrates a schematic block diagram of a core network device according to another embodiment of the disclosure.

It should be noted that in the embodiment of the disclosure, the transceiver unit 41 may be implemented by a receiver and a transmitter, and the processing unit 42 may be implemented by a processor. As illustrated in FIG. 10, the core network device 400 may include a processor 401, a receiver 402, a transmitter 403, and a memory 404. The memory 404 may be used to store a code and the like executed by the processor 401.

Various components in the core network device 400 are coupled together by a bus system 405, wherein in addition to a data bus, the bus system 405 includes a power bus, a control bus, and a status signal bus.

The core network device 40 illustrated in FIG. 9 or the core network device 400 illustrated in FIG. 10 can implement various processes implemented by the core network device in the foregoing method embodiment. To avoid repetition, details are not described herein again.

Those of ordinary skill in the art will appreciate that the units and algorithm actions of various examples described in conjunction with the embodiments disclosed herein can be implemented in electronic hardware or a combination of computer software and electronic hardware. Whether these functions are performed in hardware or software depends on the specific application and design constraints of the technical solution. A person skilled in the art can use different methods for implementing the described functions for each particular application, but such implementation should not be considered to be beyond the scope of the disclosure.

A person skilled in the art can clearly understand that for the convenience and brevity of the description, the specific working process of the system, the apparatus and the unit described above can refer to the corresponding process in the foregoing method embodiment, and details are not described herein again.

In the several embodiments provided by the present application, it should be understood that the disclosed systems, apparatuses, and methods may be implemented in other manners. For example, the apparatus embodiments described above are merely illustrative. For example, the division of the unit is only a logical function division. In actual implementation, there may be another division manner, for example, multiple units or components may be combined or integrated into another system, or some features may be ignored or not executed. In addition, the coupling or direct coupling or communication connection illustrated or discussed may be an indirect coupling or communication connection through some interfaces, apparatuses or units, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the disclosure may be integrated into one processing unit, or each unit may exist physically separately, or two or more units may be integrated into one unit.

The functions may be stored in a computer-readable storage medium if being implemented in the form of a software functional unit and sold or used as a standalone product. Based on such understanding, the technical solution of the disclosure, which is essential to the prior art or part of the technical solution, may be embodied in the form of a software product stored in a storage medium, including a plurality of instructions used to cause a computer device (which may be a personal computer, server, or network device, etc.) to perform all or part of the actions of the methods described in various embodiments of the disclosure. The foregoing storage medium includes: a U disk, a mobile hard disk, a Read-Only Memory (ROM), a Random Access Memory (RAM), a magnetic disk, or an optical disk, and the like, which may store a program code.

The foregoing is only a specific implementation of the disclosure, but the scope of protection of the disclosure is not limited thereto. Any person skilled in the art can easily think of changes or replacements within the technical scope disclosed in the disclosure, which should be covered by the scope of protection of the disclosure. Therefore, the scope of protection of the disclosure should be determined by the scope of the claims.

The invention claimed is:

1. A method for establishing an association between terminal devices, comprising:
    transmitting, by a first terminal device, information of terminal capabilities to a network device, the information of terminal capabilities being used to indicate that the first terminal device has capabilities of receiving and forwarding data;
    receiving, by the first terminal device, confirmation information transmitted by the network device and used to confirm that the first terminal device has the capabilities of receiving and forwarding data;
    after receiving the confirmation information, receiving, by the first terminal device, association request information transmitted by the second terminal device, the association request information carrying device information of the second terminal device;
    determining, by the first terminal device, whether to establish the association with the second terminal device according to stored association information and the device information of the second terminal device; wherein the association information is used to indicate the device associated with the first terminal device; and
    when the first terminal device determines to establish the association with the second terminal device, establishing, by the first terminal device, the association with the second terminal device;
    the method further comprises:
    receiving, by the first terminal device, a cluster identifier (ID) transmitted by the network device, the cluster ID being used to temporarily identify a cluster to which the first terminal device pertains, the cluster ID being allocated to the first terminal device when the network device determines that the first terminal device has the capabilities of receiving and forwarding data; wherein the cluster ID is determined according to identification of the first terminal device; and
    transmitting, by the first terminal device, the cluster ID to the second terminal device, so that the second terminal device determines, before transmitting data to the first terminal device or receiving data from the first terminal device, according to the cluster ID, whether the first terminal device is accessible and resources occupied for the data transmission or reception.

2. The method of claim 1, wherein establishing, by the first terminal device, the association with the second terminal device according to the confirmation information comprises:
    after the first terminal device receives the confirmation information, receiving association request information transmitted by the second terminal device and presenting the association request information to a user, the association request information carrying device information of the second terminal device;
    receiving, by the first terminal device, response information determined according to the device information of the second terminal device and input by the user, the response information being used to indicate, to the first terminal device, whether to establish the association with the second terminal device; and
    when the response information indicates establishing the association with the second terminal device by the first terminal device, establishing, by the first terminal device, the association with the second terminal device.

3. The method of claim 2, wherein after the first terminal device receives the confirmation information, the method further comprises:
    transmitting, by the first terminal device, first resource allocation indication information to the second terminal device,
    wherein receiving, by the first terminal device, association request information transmitted by the second terminal device comprises:
    receiving, by the first terminal device, the association request information on resources indicated by the first resource allocation indication information.

4. The method of claim 3, further comprising:
    receiving, by the first terminal device, second resource allocation indication information transmitted by the network device, wherein resources indicated by the second resource allocation indication information comprise the resources indicated by the first resource allocation indication information.

5. The method of claim 2, wherein the device information of the second terminal device comprises at least one of the following information: an ID of the second terminal device, a type of the second terminal device, a data transmitting period of the second terminal device, or QoS indication information.

6. The method of claim 1, further comprising:
    receiving, by the first terminal device, data transmitted by the second terminal device; and
    transmitting, by the first terminal device, the data to the network device according to a state of the first terminal device and Quality of Service (QoS) indication information, the QoS indication information indicating a requirement of the data for QoS.

7. The method of claim 6, wherein transmitting, by the first terminal device, the data to the network device according to the state of the first terminal device and QoS indication information comprises:
    when the first terminal device is in a connected state, transmitting, by the first terminal device, the data to the network device within a first duration since the data is successfully received; or,
    when the first terminal device is in an idle state and the QoS indication information indicates that the data is delay-sensitive data or transmission delay required by the data is less than a first preset value, establishing, by the first terminal device, connection with the network device within a second duration since the data is successfully received, and transmitting the data to the network device after the connection is established; or, when the first terminal device is in the idle state and the QoS indication information indicates that the data is delay-insensitive data, and when the first terminal device has established connection with the network device within a third duration since the data is successfully received, transmitting, by the first terminal device, the data to the network device; or, when the first terminal device is in the idle state and the QoS indication information indicates that the data has no requirement on the transmission delay, and when the first terminal device has established connection with the network device according to a service demand of the first terminal device within a fourth duration since the data is successfully received, transmitting, by the first terminal device, the data to the network device.

8. The method of claim 6, wherein receiving data transmitted by the second terminal device comprises:
receiving the data and the QoS indication information transmitted by the second terminal device.

9. The method of claim 1, wherein transmitting, by the first terminal device, information of terminal capabilities to the network device comprises at least one of the following:
transmitting, by the first terminal device, Access Stratum (AS) signaling to the base station, the AS signaling carrying the information of terminal capabilities; or,
transmitting, by the first terminal device, Non-Access Stratum (NAS) signaling to a core network device, the NAS signaling carrying the information of terminal capabilities.

10. The method of claim 1, wherein transmitting, by the first terminal device, the cluster ID to the second terminal device comprises:
transmitting, by the first terminal device, a broadcast message to the second terminal device, the broadcast message carrying the cluster ID.

11. The method of claim 10, wherein the broadcast message further carries device information of the first terminal device, the device information of the first terminal device comprising at least one of type information or power information.

12. A method for establishing an association between terminal devices, comprising:
receiving, by a second terminal device, a cluster identifier (ID) transmitted by a first terminal device, the cluster ID being used to temporarily identify a cluster, to which the first terminal device pertains, the cluster ID being allocated to the first terminal device and transmitted to the first terminal device by a network device when determining that the first terminal device has capabilities of receiving and forwarding data; wherein the cluster ID is determined according to identification of the first terminal device;
transmitting, by the second terminal device, association request information to the first terminal device, the association request information carrying device information of the second terminal device; and
when receiving association confirmation information transmitted by the first terminal device, storing, by the second terminal device, the cluster ID to establish the association with the first terminal device, wherein the association confirmation information is transmitted to the second terminal device by the first terminal device when a user or the first terminal device determines, according to the device information, to establish the association between the first terminal device and the second terminal device.

13. The method of claim 12, further comprising:
transmitting, by the second terminal device, data to the first terminal device according to a relationship between one or more detected cluster IDs and the cluster ID.

14. The method of claim 13, wherein transmitting, by the second terminal device, data to the first terminal device according to a relationship between a detected cluster ID and the cluster ID comprises:
when the cluster IDs detected by the second terminal device comprise the cluster ID and the first terminal device is of a target type, transmitting, by the second terminal device, the data to the first terminal device; or,
when the cluster IDs detected by the second terminal device comprise the cluster ID and a capability of the first terminal device is higher than a capability of each of terminal devices corresponding to other cluster IDs in the detected cluster IDs, transmitting, by the second terminal device, the data to the first terminal device.

15. The method of claim 13, further comprising:
receiving, by the second terminal device, the cluster ID and second resource indication information corresponding to the cluster ID transmitted by a base station,
wherein transmitting, by the second terminal device, association request information to the first terminal device comprises:
receiving, by the second terminal device, third resource allocation indication information, transmitted by the first terminal device, corresponding to the cluster ID, resources indicated by the third resource allocation indication information being some of resources indicated by the second resource allocation indication information; and
transmitting, by the second terminal device, the association request information to the first terminal device on resources indicated by the third resource indication information,
wherein transmitting, by the second terminal device, data to the first terminal device comprises:
transmitting, by the second terminal device, the data to the first terminal device on resources indicated by the second resource indication information.

16. The method of claim 12, further comprising:
receiving, by the second terminal device, first resource indication information transmitted by the first terminal device,
wherein transmitting, by the second terminal device, association request information to the first terminal device comprises:
transmitting, by the second terminal device, the association request information to the first terminal device on resources indicated by the first resource indication information.

17. A terminal device, comprising:
a processor; and
a memory storing instructions, which, when executed by the processor, cause the processor to perform one or more actions comprising:
transmitting information of terminal capabilities to a network device, the information of terminal capabilities being used to indicate that the terminal device has capabilities of receiving and forwarding data, receiving confirmation information for confirming that the terminal device has the capabilities of receiving and forwarding data from the network device;

after receiving the confirmation information, receiving association request information transmitted by a second terminal device, the association request information carrying device information of the second terminal device;

determining whether to establish the association with the second terminal device according to stored association information and the device information of the second terminal device; wherein the association information is used to indicate the device associated with the terminal device; and when the terminal device determines to establish the association with the second terminal device, establishing the association with the second terminal device;

the processor is further configured to perform:

receiving a cluster identifier (ID) transmitted by the network device, the cluster ID being used to temporarily identify a cluster to which the terminal device pertains, the cluster ID being allocated to the terminal device when the network device determines that the terminal device has the capabilities of receiving and forwarding data; wherein the cluster ID is determined according to identification of the terminal device; and transmitting the cluster ID to the second terminal device, so that the second terminal device determines, before transmitting data to the terminal device or receiving data from the terminal device, according to the cluster ID, whether the terminal device is accessible and resources occupied for the data transmission or reception.

18. The terminal device of claim 17, wherein the one or more actions further comprise:

after receiving the confirmation information, receiving association request information from the second terminal device and presenting the information to a user, the association request information carrying device information of the second terminal device;

receiving response information determined according to the device information of the second terminal device and input by the user, the response information being used to indicate, to the terminal device, whether to establish the association with the second terminal device; and when the response information indicates establishing the association with the second terminal device by the terminal device, establishing the association with the second terminal device.

* * * * *